United States Patent Office 2,765,861
Patented Oct. 9, 1956

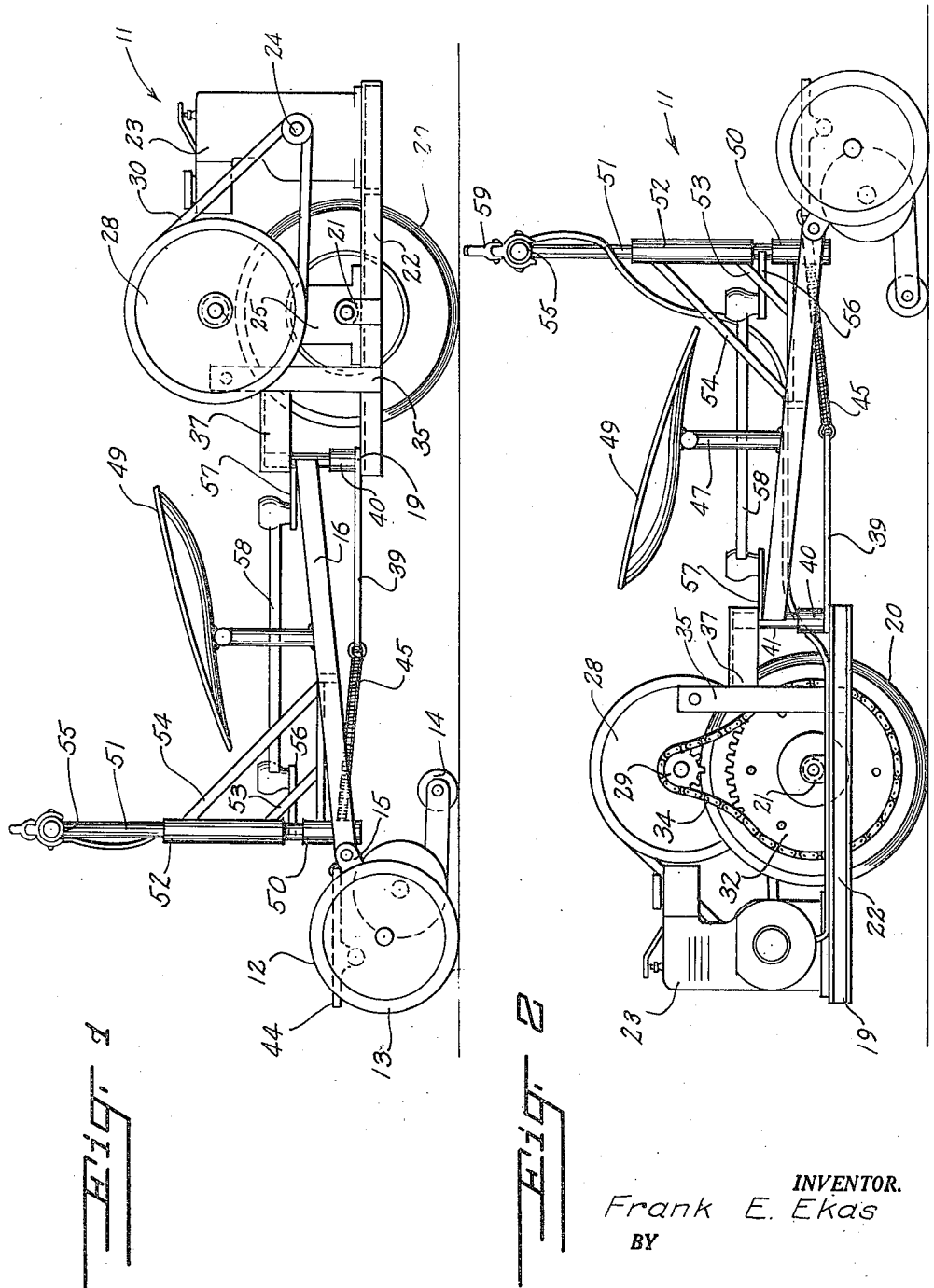

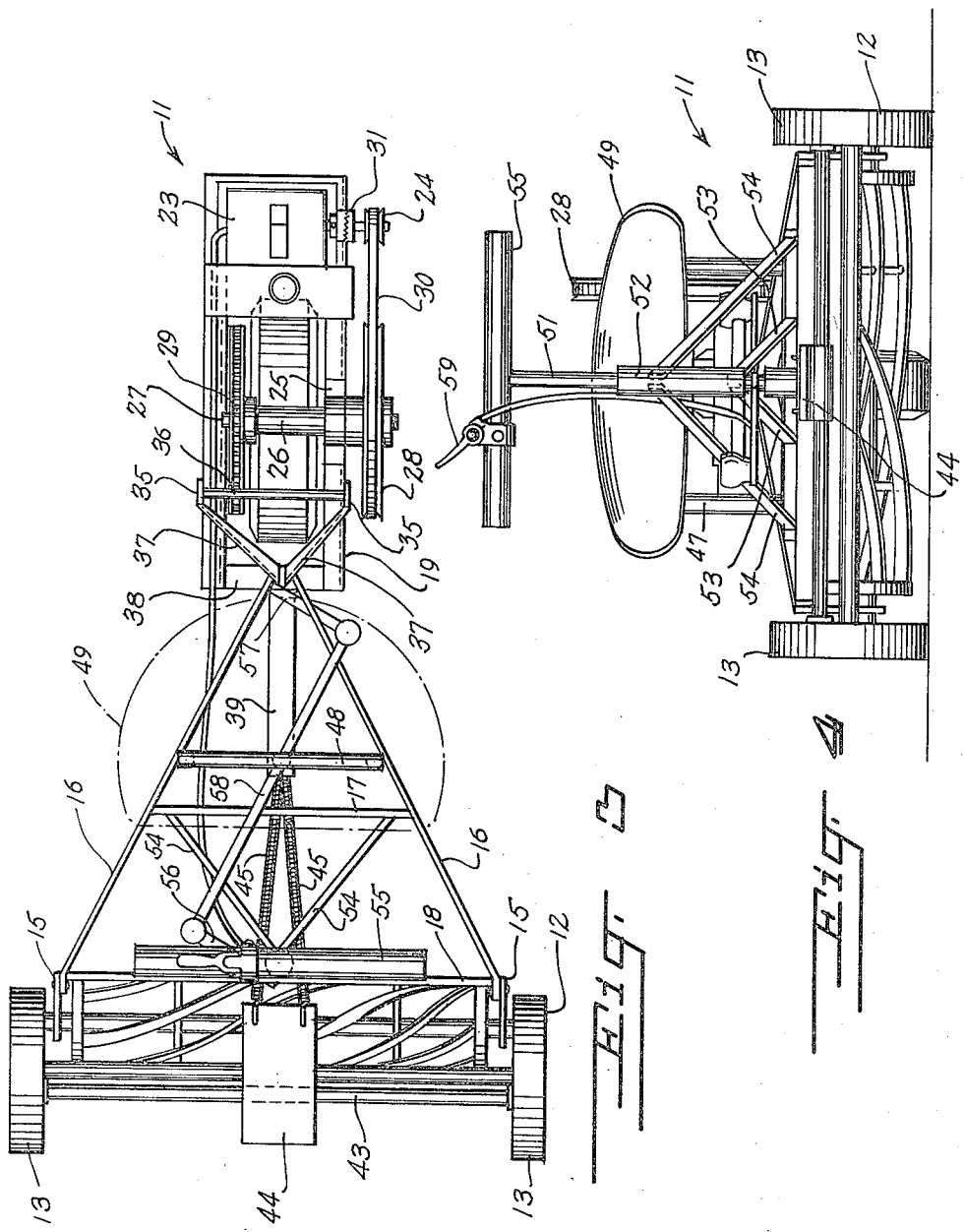

2,765,861

POWER MOWER WITH STEERABLE AND DRIVEN REAR WHEEL

Frank E. Ekas, Tarentum, Pa.

Application October 12, 1954, Serial No. 461,799

4 Claims. (Cl. 180—12)

This invention relates to mowers, and more particularly to an improved steerable power mower.

A main object of the invention is to provide a novel and improved lawn mower having means thereon for supporting the operator, said mower being simple in construction, being easy to maneuver, and having improved traction means, as compared with previously used power mowers of the same type.

A further object of the invention is to provide an improved power mower having means for supporting an operator and being steerable by the operator to guide the course of travel of the mower, the improved mower involving inexpensive components, being durable in construction, having a suitable weight distribution whereby efficient traction is provided, and being stable in operation.

Further objects and advantages of the invention will become apparent from the following description and claims, and from the accompanying drawings, wherein:

Figure 1 is a side elevational view of an improved power mower constructed in accordance with the present invention.

Figure 2 is a side elevational view of the power mower of Figure 1 taken from the opposite side thereof.

Figure 3 is a top plan view of the power mower of Figures 1 and 2.

Figure 4 is a front elevational view of the power mower of Figures 1, 2 and 3.

Referring to the drawings, the improved power mower is designated generally at 11. The mower 11 comprises a conventional mower assembly 12 of the reel type having ground-engaging driving wheels 13 and having the ground-engaging transversely extending reel roller 14. The frame of the mower assembly is provided with the respective lugs 15, 15 to which are pivotally secured the respective rearwardly convergent frame bars 16, 16, said frame bars being rigidly connected at their intermediate portions by a transverse bar member 17 and being rigidly connected adjacent the pivotal connections thereof to the lugs 15 by a forward transverse bar member 18.

Designated generally at 19 is an auxiliary frame which is generally rectangular in shape and which is supported on a ground-engaging wheel 20 journaled in the forward portion of the frame 19 between respective journal brackets 21, 21 secured to the side members 22 of the frame 19. Mounted on the rear portion of the frame 19 is a motor 23, which may be a conventional internal combustion engine, having the output pulley 24.

Mounted on one of the side members 22 of frame 19 is an upstanding bearing bracket 25 having rigidly secured thereto the transversely extending horizontal bearing sleeve 26 in which is journaled the transverse shaft 27. The shaft 27 has secured to one end thereof the large pulley 28 and has secured to the other end thereof the relatively small sprocket gear 29. The large pulley 28 is coupled to the motor pulley 24 by a belt 30. As shown in Figure 3, the motor pulley 24 is connected to the motor crank shaft through a conventional automatic clutch 31, for example of the type comprising a pair of mating toothed clutch discs biased together by suitable yieldable means and connected respectively to the motor crank shaft and the motor pulley.

Secured to the ground-engaging wheel 20 concentrically therewith is the large sprocket wheel 32 which is coupled to the sprocket wheel 29 by a sprocket chain 34. Motor 23 is thus drivingly coupled to the ground-engaging wheel 20, and the weight of the motor and its position at the rear portion of the auxiliary frame 19 acts to provide high traction for said ground-engaging wheel 20.

Secured to the forward portions of the side members 22 of auxiliary frame 19 are the upstanding vertical bars 35, 35 which are connected rigidly at their top ends by the transversely extending rod 36 which partially overlies the sprocket chain 34 and thus serves as a guard means for preventing the operator of the device from coming into contact with the sprocket chain and the sprocket wheels, as well as the ground-engaging wheel 20, which said rod member also overlies.

Secured to the intermediate portions of the upstanding bar members 35 are the forwardly convergent, horizontally extending bars 37, 37 which are rigidly connected together at their forward ends. Rigidly secured to the transverse bar element 38 at the forward end of the auxiliary frame 19 is a longitudinally and forwardly extending flat bar 39. Rigidly secured on the end portion of bar 39 overlying the transverse member 38 is the upstanding bearing sleeve 40. Journaled between the forward ends of the convergent bars 37, 37 and the bearing sleeve 40 is a vertical pivot shaft 41. The convergent frame bars 16, 16 are rigidly connected to opposite sides of the intermediate portion of the pivot shaft 41, defining a pivotal connection between the forward assembly including the mower assembly 12 and its frame bars 16, 16, and the auxiliary frame 19, whereby the forward assembly may pivot around the vertical axis defined by the shaft 41.

Rigidly secured to the upper transverse connecting rod 43 of the mower assembly 12 is a substantially horizontal plate member 44 which is arranged longitudinally, and which is located substantially at the intermediate portion of the transverse rod 43. Respective coiled springs 45, 45 are connected between the rear corner portions of the plate 44 and the end of the flat bar 39, whereby the forward ends of the springs 45, 45 are transversely spaced apart by a substantial distance, and whereby the springs are arranged to oppose rotation of the mower assembly relative to the auxiliary frame 19 but to yield when necessary in order to allow such rotation.

Secured to the frame bars 16, 16 rearwardly adjacent the transverse bar member 17 are the upstanding supporting posts 47 which are rigidly connected at their top ends by a transverse bar member 48 on which is rigidly secured the operator's seat 49.

Rigidly secured to the intermediate portion of the transverse bar member 18 is the vertical bearing sleeve 50. Designated at 51 is a vertical steering post having its lower end portion rotatably supported in the steering post bearing sleeve 50 and being rotatably supported at its intermediate portion in a vertical sleeve 52 rigidly secured to the transverse bar member 17 by respective pairs of inclined struts 53, 54, as shown in Figure 4. Rigidly secured to the top end of the steering post 51 is a transversely extending steering handle 55.

Rigidly secured to the steering post 51 between the sleeves 50 and 52 is a horizontal arm 56. Rigidly secured to the pivot shaft 41 is a horizontal arm 57, the arms 56 and 57 projecting laterally in opposite directions, as shown in Figure 3. A link rod 58 connects the ends of the arms 56 and 57, whereby the auxiliary frame 19 may be rotated by rotating the steering post 51 by means of its handle 55, whereby the mower may be steered as required.

The usual control means for the motor 23 may be mounted on the steering handle 55, for example, the conventional throttle lever 59 may be mounted on the handle 55 and may be connected to the motor by means of a Bowden cable, in a manner well known in the art.

By employing the coiled springs 45, 45, the steering action is stabilized and the mower may be steered around abrupt curves without risk of injury to the operator, since the springs 45, 45 provide a cushioned steering action which cooperates with the steering linkage comprising arms 56, 57 and the connecting link 58 to provide smooth steering. Due to the location of the motor 23 on the rear portion of the auxiliary frame 19, proper traction is always provided, since the weight of the motor assists the ground-engaging wheel 20 in developing necessary traction, and also, when turning the vehicle around relatively sharp curves, the weight of the motor provides the necessary tractive force to cause the vehicle to move around the curves without becoming unbalanced.

While a specific embodiment of an improved power mower has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A lawn mower comprising a mower assembly of the reel type having ground-engaging reel driving wheels, rearwardly extending frame means of substantial length secured to said mower assembly, an auxiliary frame, a vertical pivot shaft pivotally connecting the rear end of said frame means to the forward end of said auxiliary frame, a traction wheel supportingly journaled to said auxiliary frame, a motor mounted on said auxiliary frame, means drivingly connecting said motor to said traction wheel, an operator's seat mounted on said rearwardly extending frame means, a steering shaft rotatably mounted on said frame means forwardly of said operator's seat, and a steering linkage connecting said steering shaft to said auxiliary frame and arranged to rotate said auxiliary frame relative to said frame means around the vertical pivot shaft.

2. A lawn mower comprising a mower assembly of the reel type having ground-engaging reel driving wheels, rearwardly extending frame means of substantial length secured to said mower assembly, an auxiliary frame, a vertical pivot shaft pivotally connecting the rear end of said frame means to the forward end of said auxiliary frame, a traction wheel supportingly journaled to said auxiliary frame, a motor mounted on said auxiliary frame, means drivingly connecting said motor to said traction wheel, an operator's seat mounted on said rearwardly extending frame means, a steering shaft rotatably mounted on said frame means forwardly of said operator's seat, a steering linkage connecting said steering shaft to said auxiliary frame and arranged to rotate said auxiliary frame relative to said frame means around the vertical pivot shaft, and spring means connecting said mower assembly to the forward portion of said auxiliary frame and being arranged to oppose rotation of said mower assembly relative to said auxiliary frame.

3. A lawn mower comprising a mower assembly of the reel type having ground-engaging reel driving wheels, rearwardly extending frame means of substantial length, means pivotally connecting said frame means to said mower assembly and arranged to allow pivoting of said mower assembly relative to said frame means on a transverse horizontal axis, an auxiliary frame, a vertical pivot shaft pivotally connecting the rear end of said frame means to the forward end of said auxiliary frame, a traction wheel supportingly journaled to said auxiliary frame, a motor mounted on said auxiliary frame, means drivingly connecting said motor to said traction wheel, an operator's seat mounted on said rearwardly extending frame means, a steering shaft rotatably mounted on said frame means forwardly of said operator's seat, a steering linkage connecting said steering shaft to said auxiliary frame and arranged to rotate said auxiliary frame relative to said frame means around the vertical pivot shaft, and spring means connecting said mower assembly to the forward portion of said auxiliary frame and being arranged to oppose rotation of said mower assembly relative to said auxiliary frame.

4. A lawn mower comprising a mower assembly of the reel type having ground-engaging reel driving wheels, rearwardly extending frame means of substantial length, means pivotally connecting said frame means to said mower assembly and arranged to allow pivoting of said mower assembly relative to said frame means on a transverse horizontal axis, an auxiliary frame, a vertical pivot shaft pivotally connecting the rear end of said frame means to the forward end of said auxiliary frame, a traction wheel supportingly journaled to said auxiliary frame, a motor mounted on said auxiliary frame, means drivingly connecting said motor to said traction wheel, an operator's seat mounted on said rearwardly extending frame means, a steering shaft rotatably mounted on said frame means forwardly of said operator's seat, a steering linkage connecting said steering shaft to said auxiliary frame and arranged to rotate said auxiliary frame relative to said frame means around the vertical pivot shaft, and a pair of coiled springs connecting a common point on the forward portion of said auxiliary frame to a pair of transversely spaced points on said mower assembly and being arranged to oppose rotation of said mower assembly relative to said auxiliary frame.

References Cited in the file of this patent

UNITED STATES PATENTS

| | | |
|---|---|---|
| 1,435,753 | Stolz | Nov. 14, 1922 |
| 1,492,491 | Swope | Apr. 29, 1924 |
| 1,557,902 | Thompson | Oct. 20, 1925 |